United States Patent Office 3,495,977
Patented Feb. 17, 1970

3,495,977
STAINLESS STEEL RESISTANT TO STRESS
CORROSION CRACKING
Elbert E. Denhard, Jr., Towson, and Ronald H. Espy,
Randallstown, Md., assignors to Armco Steel Corporation, Middletown, Ohio, a corporation of Ohio
No Drawing. Filed Sept. 30, 1965, Ser. No. 491,880
Int. Cl. C22c 39/20, 39/26, 39/44
U.S. Cl. 75—128                                          13 Claims

ABSTRACT OF THE DISCLOSURE

Chromium-nickel base aloy enjoying a combination of good hot-workability and welding characteristics in combination with good stress-corrosion crack resistance and general corrosion resistance. The alloy contains about 15% to 25% chromium, about 35% to 50% nickel, about 3.5% to 12% manganese, up to about .15% carbon with descending minimum carbon contents of at least .10%, .06%, .04% and .02% for respective increasing nickel contents of about 35%, 40% 45% and 50%, and remainder substantially iron.

---

As a matter of introduction, our invention relates to the highly alloyed metals, particularly those suited to applications involving great stress under conditions of corrosive attack.

One of the objects of the invention is the provision of a fully austenitic alloy employing a minimum of the expensive alloying ingredients chromium and nickel, which alloy is possessed of good hot-working properties, which readily lends itself to fabrication through a variety of welding techniques, and which is possessed of a combination of good general corrosion resistance and good stress-corrosion resistance, i.e., good resistance to corrosion under the stresses encountered in actual use.

Another object is the provision of the alloy castings, forgings, hot-worked products such as plate, sheet, strip and other flat-rolled products, as well as bar, rod, wire and tubing, and various cold-worked products, including weld filler wire, all of which castings, forgings, hot-worked products and cold-worked products are possessed of good stress corrosion crack resistance in combination with good general corrosion resistance and resistance to intergranular attack.

A further object is the provision of a variety of articles, products, and pieces of equipment which are strong and durable under conditions of corrosive attack, as in the petroleum refining, chemical and nuclear industries, and the like, such for example as vats, tanks, liners, piping, tubing, valves and fittings.

Other objects of our invention in part will be obvious and in part pointed out more fully in the description which follows.

Accordingly, our invention may be considered to reside in the combination of elements, composition of ingredients and in the relation between each of the same with one or more of the others, as well as in the articles, products and pieces of equipment described herein, the scope of the useful application of all of which is indicated in the claims at the end of the specification.

Background of the invention

As conducive to a better understanding of certain features of our invention, it may be noted that in the field of the highly alloyed metals, the metal known as "Inconel" (about 16% chromium, about 76% nickel, and about 8% iron) is particularly suited to applications where there are encountered corrosive conditions under stress. This metal, while resistant to general corrosive attack and resistant to corrosion cracking under the conditions encountered in use, is expensive, especially because of the high nickel requirement. Moreover, we find that the metal is difficult to weld in heavy sections with positive assurance of success.

The alloy "Incoloy 800" (chromium about 19% to 23%, nickel about 30% to 35%, carbon .10% max., manganese 1.50% max., silicon 1.00% max., sulphur .030% max., copper .75% max., and remainder iron), while less expensive than Inconel and resistant to stress-corrosion cracking in hydrogen-hydrogen sulphide atmospheres, is not readily weldable in large sections, and does not adequately withstand the severe stress corrosion environments of chlorides.

And we note that the chromium-nickel stainless steels, for example, the Types 304 and 304L (18% to 20% chromium, 8% to 12% nickel, and remainder iron–.03% max. carbon for Type 304L), Type 305 (17% to 19% chromium, 10% to 13% nickel, and remainder iron), Type 309 (22% to 24% chromium, 12% to 15% nickel, and remainder iron), Type 310 (24% to 26% chromium, 19% to 22% nickel, and remainder iron), Types 316 and 316L (16% to 18% chromium, 10% to 14% nickel, 2% to 3% molybdenum, and remainder iron–.03% max. carbon for the 316L), although employing less of the expensive alloying ingredient nickel, and possessing good welding characteristics, do not satisfactorily resist stress-corrosion cracking under conditions of the character encountered in actual use. As a consequence, the known chromium-nickel stainless steels are not suited to applications in the petroleum and chemical industries where great stresses are encountered under conditions of corrosion; these steels are not assuredly resistant to stress-corrosion cracking.

Accordingly, one of the objects of our invention is the provision of an austenitic chromium-nickel-iron alloy which is leaner than Inconel and other highly alloyed metals, which readily lends itself to welding even in heavy sections, and which is resistant to stress-corrosion cracking and resistant to general corrosion and intergranular attack as in the petroleum, the chemical, the nuclear, and like industries.

Summary of the invention

Referring now more particularly to the practice of our invention, we find that in the chromium-nickel-iron alloys the susceptibility of trans-granular stress-corrosion cracking is lowered as the nickel content is raised. Substantial immunity to stress-corrosion cracking in a magnesium-chloride media requires a nickel content of at least 40%. It appears that the chloride ion is most frequently associated with stress-corrosion cracking. And even though the chloride content of the media may be low, there may be an opportunity for chloride concentration as a result of the evaporation of water as in the splash surfaces of a tank or a vat well above the usual liquid level. The effect of the presence of the fluoride ion is similar.

We find also that the condition of the metal itself is a factor in the development of tress corrosion cracking. While the hardness of the metal per se, seems to be of little consequence, the character of the surface finish may not be dismissed. It seems that the highly localized stresses resulting from certain fabricating operations such, for example, as shearing, provide focal points for the initiation of stress-corrosion cracks. Moreover, in the common de-scaling processes, as in pickling, minute notches develop at the tips of intergranular fissures. And these apparently serve as stress risers to promote stress-corrosion cracking.

In boilers, evaporators, heat-exchangers and like apparatus and equipment there frequently is provided an opportunity for concentration of the chemicals which result in stress-corrosion cracking. Actually, such cracking frequently occurs in an environment where there is little overall corrosion. Although it is generally agreed that stress-corrosion cracking is an electro-chemical phenomenon, effects to control such cracking through use of inhibitors, oxygen scavengers and even an electrical current have not met with complete success; these are but inadequate expedients at best.

In accordance with the practice of our invention, we provide an austenitic alloy essentially consisting of the three ingredients chromium, nickel and iron, together with the further ingredients carbon and manganese, all in particular and critical amounts. Best results are had in matters of stress-corrosion crack resistance where the sulphur content normally present in the metal is restricted to a low figure, and silicon is present in substantial amount. Where desired, certain further benefits are achieved by including a small amount of columbium in the composition.

In the austenitic chromium-nickel-iron alloy of our invention, the chromium content ranges from about 15% to about 25%, the nickel from about 35% to about 50%, and the manganese from about 3.5% to about 12%, and more especially from about 5% to about 12%. The carbon content of our alloy is in amounts up to .15%; preferably for best results, as pointed out more fully hereinafter, it amounts to some 0.03% to 0.10%. The remainder of the alloy is substantially all iron. Sulphur and phosphorus ordinarily are present in our alloy, the sulphur in amounts not exceeding .03%, preferably not exceeding about 0.015%, and the phosphorus in amounts not exceeding .04%. Molybdenum in amounts up to about 3.0% and copper in amounts up to about 3.0% may be employed where desired. Silicon is present in amounts up to 2.0%; preferably silicon is present in the amount of 0.50% to 1.00% for reasons more particularly given below. Columbium preferably is employed in our alloy, this in the amount of about 0.10% to about 0.20%, though it may be used in amounts up to 1.0% or even up to 1.5%. Vanadium, titanium or other strong carbide-forming ingredient may be employed in the composition of the alloy as desired. The remainder of the alloy, as noted above, is essentially all iron, this amounting to some 8% to about 45%.

In the alloy of our invention the particular percentage ranges of each of the several ingredients is in every sense critical. Thus, the chromium content should not be less than about 15% because at lower chromium values the general corrosion-resistance sharply suffers; for applications encountering a combination of heat and pressure a chromium content of 19% to 25% is employed because of the enhanced corrosion resistance had under these conditions. A chromium content exceeding about 25% is not desired because the cost of the metal becomes excessive without significant benefit. Moreover, the higher chromium content results in hot-working difficulties.

Similarly, the nickel, the manganese and the carbon content, all are critical. With a nickel content less than about 35% we find that the metal is not assuredly resistant to stress-corrosion cracking. And with a nickel content exceeding 50%, the solubility for carbon drastically suffers. The desired weldability of our metal suffers when the manganese content is less than about 5%. And with manganese exceeding about 12% there is little or no benefit.

In our alloy carbon is necessary to provide desired yield strength. And the amount of carbon, with respect to the amount of nickel, is highly critical. In general, the minimum carbon level must be increased as the nickel level is decreased as noted more fully below. We find that sufficient carbon is required to provide what we theorize to be a carbide network (although not visible in the microscope) to protect the metal against an electrolytic action which would be inclined to cause sudden deterioration. Regardless of theory, however, we find that where the carbon content is less than about 0.03% the yield strength is inclined to suffer; with a carbon content exceeding about .15% the general corrosion resistance suffers; and with insufficient carbon for any particular nickel level the metal becomes extremely susceptible to intergranular corrosion following the welding operation. We find that a best combination of general corrosion resistance along with the resistance to intergranular corrosion and resistance to trans-granular stress-corrosion cracking is had with a carbon content of at least about .01%. About .02% carbon is required for a nickel content of about 50%; a carbon content of at least .04% is required for a nickel content of 45%; a carbon content of at least .06% or .07% is required for a nickel content of about 40%; and a carbon content of at least about .10% for a nickel content of about 35%.

In the alloy of our invention it seems that the presence of a small amount of silicon is important. We feel that the silicon migrates to the surface of the metal upon annealing and forms a protective oxide film, the silicon in the film being in an amount which is disproportionately high with respect to the overall silicon content of the metal itself. We feel that an average silicon content of at least 0.05% is desirable. While a higher silicon content, even as much as 4%, would be beneficial in the development of the protective oxide film, there is the disadvantage that the high silicon content tends to promote weld bead cracking. And from that standpoint, we can tolerate only up to about 2% silicon, i.e., a silicon content of about 2% as a maximum. In some applications a necessary silicon content is not required, in which applications silicon in amounts less than .50% is acceptable; the silicon content of our steel then, broadly, is in amounts up to 1.0% or 2.0%.

Maximum resistance against stress-corrosion cracking is had with extremely low sulphur and phosphorus contents. Good results are had where the sulphur and phosphorus contents each does not exceed 0.015%, although sulphur and phosphorus each in amounts up to .03% as maximum can be tolerated. But best results are had with values well below 0.015%.

In the austenitic chromium-nickel-iron alloy of our invention columbium is not an essential ingredient as noted above. Columbium up to 1.5% may be employed, especially since we find that columbium in the amount of about 1.0% increases the yield strength of our alloy. And in flat rolled products such, for example, as annealed and pickled sheet, the presence of a small amount of columbium is most beneficial. It eliminates intergranular attack during pickling and moreover gives a finer grain structure. As a result it eliminates edge cracking during the cold-rolling operation and therefore aids in preventing points of incipient corrosion cracking. In the flat rolled products, therefore, we preferably employ columbium in the amount of 0.1% to 0.2%, since columbium in an amount less than the 0.1% figure seems to be of no benefit and columbium in an amount exceeding 0.2% is not particularly desirable unless increased yield strength is required as noted, because it ties up an excessive amount of the carbon present in the metal, with the result that the remaining carbon present in the metal very well may be insufficient to aid in the prevention of stress-corrosion cracking.

A small amount of boron may be included in the composition as an aid to hot-working the metal, the amount usually being on the order of .003%, although it may amount to as much as .010% as a maximum. A low nitrogen content, not over about .05% and preferably under .03%, generally is desired since we find that nitrogen in the presence of large quantities of nickel introduces hot-working difficulties and extra quantities of nickel at extra cost becomes necessary to offset the adverse effects of excessive nitrogen.

DESCRIPTION OF THE PREFERRED EMBODIMENTS

A preferred alloy in accordance with the practice of our invention essentially consists of about 15% to about 21% chromium, or even about 15% to about 25% chromium, about 40% to 45% nickel, about 5% to about 12% manganese, about .04% to about .10% carbon, or carbon about .04% to about .15%, and remainder substantially all iron. In this alloy sulphur may be present in an amount not exceeding about .03% and preferably not exceeding about .015%. Phosphorus may be present in amounts up to .03% or .04%. In this alloy silicon preferably is in the amont of about .50% to about 1.00%, although where desired it may be employed in any amount up to 2.0%. Columbium may be employed in the amount of about .10% to .20%. In this alloy there is had a combination of good general corrosion resistance along with good stress-corrosion resistance; with a higher carbon content there is some sacrifice in the general corrosion resistance of the metal and with a lower nickel content the resistance to stress-corrosion cracking is inclined to suffer.

A further preferred alloy essentially consists of about 15% to about 25% chromium, preferably about 15% to about 21% chromium, about 35% to about 40% nickel, about 5% to about 12% manganese, about .06% to about .15% carbon, or more preferably carbon about .06% to about .10%, up to 2.0% silicon, preferably .50% to 1.00%, and remainder substantially all iron. Here again, in this preferred alloy, the sulphur content preferably does not exceed .015%, but the phosphorus content may amount to as much as .03% or .04%. In flat rolled products, as noted above, columbium preferably is included in the amount of about .10% to about .20%, although where desired, it may be employed in amounts of about 1% or even up to 1.5%.

A still further preferred alloy in accordance with the teachings of our invention essentially consists of about 15% to about 21% chromium or even to about 25% chromium, about 45% to about 50% nickel, about 5% to about 12% manganese, about .03% to about .10% carbon, or carbon in amounts up to about .15%, silicon up to 2.0% and preferably .50% to 1.00%, columbium up to about 1.5%, preferably in the amount of about .10% to about .20%, and remainder substantially all iron. Sulphur may be present in amounts up to 0.3%, preferably up to .015%, and phosphorus up to .04%. In this preferred alloy there is had a good combination of general corrosion resistance, intergranular corrosion resistance and stress-corrosion crack resistance, all in addition to good strength.

The alloy of our invention may be made in the electric arc furnace or in the induction furnace, as desired. The alloy also may be vacum melted as by melting in an electric arc furnace under vacuum conditions. Or it may be melted by way of a double melting proess, that is, melted in the electric arc furnace or in the induction furnace with the resultant heat of metal being cast in the form of electrodes which are then remelted under vacuum conditions.

The metal, by whatever melting process employed, may be cast in the form of ingots and then converted into slabs, blooms and billets and thence into various hot-worked products such as plate, sheet, strip, tubes, bars and wires, converted products which are finished or fabricated into a host of articles, and a host of products, equipment and apparatus for use in the petroleum, chemical and other industries. Or where desired, the metal may be converted into forging stock and fashioned into a variety of articles of ultimate use, or be remelted and cast into specific articles of use.

The alloy of our invention is particularly suited to the production of tanks, liners, valves, piping, fittings and the like in the refining of petroleum and petroleum products. So, too, our alloy is suited to the production of heat exchangers and a wide variety of vats, tanks, liners, fittings, valves, etc. in the chemical industry where the metal is subjected to stress under the conditions of active corrosive attack. Moreover, the metal is suited to the production of domestic and industrial hot water tanks as well as their associated liners, piping, valves and fittings. And our alloy readily lends itself to the production of a variety of welded articles, products and structures suited to duty in corrosive atmospheres in the as-welded condition, that is, without necessity for post-weld heat-treatment such as stress-relieving, equalizing or annealing.

In all of the above applications the alloy of our invention lends itself to ready fabrication, as by cutting, bending, drawing, tapping, threading, and the like. Moreover, as noted above, the metal even in heavy sections is readily welded with full assurance of a sound weld with retention of strength in combination with freedom from intergranular corrosion and stress-corrosion cracking under conditions encountered in use.

The critical character of the chemical composition of the alloy of our invention (Heats R4475 and R4566) is revealed partially by comparison with the other alloys given below and their accompanying stress-corrosion properties. The chemical composition of the various alloys is set out in Table I below, their stress-corrosion properties being given in Table II which follows.

TABLE I.—CHEMICAL COMPOSITION OF FOURTEEN CHROMIUM-NICKEL-IRON ALLOYS

| Heat number: | C | Mn | Si | Cr | Ni | Cb | N |
|---|---|---|---|---|---|---|---|
| Type 304 | .052 | 1.29 | .64 | 18.79 | 9.38 | | |
| Incoloy | .046 | .92 | .35 | 19.67 | 31.51 | | |
| Inconel | .044 | .26 | .30 | 15.06 | 75.5 | | |
| R2760 | .076 | .47 | .52 | 15.11 | 25.39 | | |
| R2759 | .014 | .49 | .61 | 14.88 | 34.31 | | |
| R2761 | .075 | .53 | .64 | 15.68 | 35.22 | .69 | .10 |
| R5479 | .021 | 3.60 | .10 | 15.06 | 35.28 | | |
| R5484 | .071 | 3.78 | 1.00 | 15.23 | 35.31 | | |
| R5481 [1] | .022 | 3.30 | 1.23 | 20.19 | 50.32 | | |
| R4474 | .045 | 9.87 | .26 | 16.16 | 35.6 | | |
| R4475 [1] | .11 | 9.2 | .23 | 15.72 | 35.7 | | |
| R4566 [1] | .058 | 9.62 | .56 | 16.26 | 40.46 | | .035 |
| 033120 [1] | .096 | 10.00 | .98 | 17.82 | 40.49 | | |
| R4791-2 | .02 | 10 | .50 | 18 | 45 | .10 | .20 |

[1] Alloys of the invention.

The alloys of Table I in the form of ¼" round multi-notched samples ($K_t=1.3$) [2] were annealed at 2000° F. for 5 minutes and water-quenched. They were then subjected to extremely severe and accelerated stress-corrosion testing conditions. The samples were heavily loaded and half-way immersed in boiling magnesium chloride solution (42% aqueous solution at temperature of about ---
[2] Stress concentration factor, Heinz Neuber. Theory of Notch Stresses; Principles for Exact Stress Calculation. J. Springer, Berlin, 1937; English edition: Edwards Co., Ann Arbor, Mich. (trans. by F. A. Raven).

309° F.) for the times indicated and stresses indicated, with results all as given in Table II below:

TABLE II.—STRESS-CORROSION PROPERTIES OF THE ALLOYS OF TABLE I

| Heat number: | Applied stress in p.s.i. | Time in hours | Result |
|---|---|---|---|
| Type 304 | 70,000 | .25 | Failed. |
| Incoloy | 65,000 | 40 | Do. |
| Inconel | 75,000 | 1,000, stopped | No failure. |
| R2760 | 80,000 | 1,000, stopped | Do. |
| R2759 | 73,000 | 680 | Failed. |
| R7761 | 80,000 | 490 | Do. |
| R5479 | 75,000 | 225 | Do. |
| R5484 | 75,000 | 160 | Do. |
| R5481 [1] | 75,000 | 1,000, stopped | No failure. |
| R4474 | 75,000 | 110 | Failed. |
| R4475 [1] | 75,000 | 1,000, stopped | No failure. |
| R4566 [1] | 80,000 | 600 | Failed, due pits. |
| 033120 [1] | 80,000 | 1,000, stopped | No failure. |
| R4791-2 | 70,000 | 200 | Failed. |

[1] Alloys of the invention.

From the data presented above it appears that the prior art chromium-nickel-iron alloys of high nickel contents (Inconel and Heats R2760 and R2759) are characterized by good stress-corrosion life under corrosive conditions (although it is noted that Incoloy with 31.51% nickel and 19.67% chromium and .046% carbon had but little life). All of these alloys are of low manganese content. And unfortunately, we find that such low manganese alloys do not weld satisfactorily. The high manganese alloys do weld satisfactorily. But in the high manganese alloy there must be preserved a proper balance of the ingredients carbon and nickel to achieve good stress-corrosion properties. (Compare R4475 of high carbon content and about 35% nickel content having a stress corrosion life of 1,000 hours and more at 75,000 p.s.i., with R4474 of low carbon content and about 35% nickel where the alloy failed in 110 hours under a load of 75,000 p.s.i.; also compare R5481 of high nickel content and about .02% carbon having a life of 1,000 hours and more at 75,000 p.s.i., with R5479 of medium nickel content and also about .02% carbon having a life of only 225 hours at 75,000 p.s.i.)

The alloy offering a combination of good weldability, good stress-corrosion properties and good general corrosion characteristics is typified by the alloy containing carbon and nickel in proper balance, along with manganese, chromium and iron (for example, Heat R4475—carbon .11% and nickel 35.7%; Heats 033120 and R4566 with carbon .096% and .058%, respectively, and nickel about 40.5% for both; and Heat R5481 with carbon .022% and nickel 50.32%, all having good stress-corrosion life). Where the carbon content is low, nickel is high and nitrogen in substantial amount also is present; even where columbium is present, desired stress-corrosion resistance is not had (R4791-2 with a carbon content of .02%, a nickel content of 45%, a nitrogen content of .20% and a columbium content of .10% has a life of only 200 hours under a stress of 70,000 p.s.i.). Where the carbon content is substantial, as noted above, a greater life is had (R4566 with carbon .058%, nitrogen .035% along with 9.62% manganese, 16.26% chromium, 40.46% nickel, and remainder iron, was found to fail only as a result of pitting after 600 hours under the significantly higher load of 80,000 p.s.i.).

The crack-resisting character of the chromium-nickel-manganese-iron alloy of our invention, in matters of overall resistance to crack sensitivity, after welding, as compared with known alloys, is revealed by the tests reported below in Tables III and IV, the chemical composition of the alloys being set out in Table III and the report on the crack sensitivity (the crack sensitivity) at-the-notch, the number of cracks on un-notched bend test samples, and the overall crack sensitivity being given in Table IV. The reported ratings are for two or more samples in each instance.

In every case reported below the alloy was in the form of .050″ thick sheet, the various test specimens being fusion welded (no filler added), using for that purpose the inert gas tungsten arc process. Each alloy was rated on the basis of the resistance of the weld deposit to cracking at a notch area provided from edge to center of the sample (heavy cracking in the notch area being denoted as 3; moderate cracking in such area as 2; light cracking as 1; and no cracking in the notch area as 0). In addition to the crack sensitivity at-the-notch, there was made a longitudinal bend test on each weld bead, which weld bead was examined for defects and reported as number of cracks on the un-notched bend test sample. The overall crack sensitivity is set out as the sum of the crack sensitivity at-the-notch rating and the bend test rating.

TABLE III.—APPROXIMATE CHEMICAL COMPOSITION OF TEST SAMPLES
[Prior Art Alloys]

| | C | Mn | Si | Cr | Ni | Other |
|---|---|---|---|---|---|---|
| Heat number: | | | | | | |
| 3524 | .06 | | | 18 | 35 | |
| 3525 | .06 | | | 18 | 35 | .15 Cb |
| 4033 | .08 | | | 18 | 35 | .50 Al |
| 4034 | .08 | | | 18 | 35 | .50 Al, .15 Cb |
| 4036 | .02 | | | 18 | 35 | .50 Al, .15 Cb |
| Inconel | .04 | | | 15.8 | 76.0 | |

[Other Alloys Investigated]

| 4474 | .04 | 10 | .25 | 16 | 35 | |
| 4475 [1] | .10 | 10 | .25 | 16 | 35 | |
| 4476 | .04 | 10 | .25 | 16 | 35 | 2.25 Mo |
| 4477 | .10 | 10 | .25 | 16 | 40 | 2.25 Mo |
| 4564 | .10 | 10 | .50 | 16 | 35 | .12 N |
| 4565 | .05 | 10 | .50 | 16 | 40 | |
| 4566 [1] | .10 | 10 | .50 | 16 | 40 | 3.0 Cu, .12 N |

[1] Alloys of the invention.

The crack-sensitivity at-the-notch rating of the samples of composition and weld method set out in Table III, the bend test rating, and the overall crack sensitivity rating (a summation of the two ratings) is given in Table IV:

TABLE IV.—CRACK SENSITIVITY OF THE SAMPLES OF TABLE III
[Prior Art Alloys]

| | Crack sensitivity at-the-notch rating | Number of cracks on bend test sample (no notch) | Overall crack sensitivity |
|---|---|---|---|
| Heat number: | | | |
| 3524 | 3 | 0 | 3 |
| 3525 | 3 | 4 | 7 |
| 4033 | 3 | 0 | 3 |
| 4034 | 2.5 | 8 | 10.5 |
| 4035 | 2.5 | 0 | 2.5 |
| Inconel | 2 | 1 | 3 |

[Other alloys Investigated]

| 4474 | 1 | 0 | 1 |
| 4475 [1] | 0.5 | 0 | 0.5 |
| 4476 | 0.5 | 0 | 0.5 |
| 4477 | 1 | 0 | 1 |
| 4564 [2] | 0 | | |
| 4565 [2] | 1 | | |
| 4566 [2] | 0 | | |

[1] Alloys of the invention.
[2] No bend tests were made on these three heats. Test welds were .113″ thick sheet instead of .050″.

The test data presented above clearly reveals the crack-resisting character of the chromium-nickel-manganese-iron alloys of our invention, this as compared with that of the high-chromium, high-nickel Cr-Ni-Fe alloys of the prior art. While our alloys have an overall crack sensitivity of some 0.5 to 1, those of the prior art whether of low or significant carbon content and whether or not the additional agents aluminum or columbium were present, have overall sensitivities ranging from 2.5 on up to 10.5. Not only is the crack sensitivity at-the-notch uniformly bad (about 3) for the prior art samples (as against ratings of 0 to 1 for the alloy of our invention); it is the erratic ratings of the unnotched bend test samples that are especially bad, these ranging from 0 to 8 for the prior art as against 0 for the alloys of interest.

The new and surprising character of our alloy is further revealed by the results of a series of further tests on all-weld-metal. The comparative tensile tests, the appearance of the tensile fractures and the appearance of the surface following an overlay bend test, for samples of the weld filler compositions reported in Table V, are reported below in Table VI. The reported figures are averages of duplicate specimens.

.10% carbon, and remainder iron) as well as the core wire itself, the strength is about the same as the commercial product but the ductility is significantly better, 37.0 to 39.5% elongation as compared to 34.0% for the commercial product.

It is perhaps in the character of surface of the overlay

TABLE V.—CHEMICAL COMPOSITION OF EXAMPLES OF WELD FILLER METAL

| | C | Mn | P | S | Si | Cr | N | Cb | W |
|---|---|---|---|---|---|---|---|---|---|
| Bare wire: | | | | | | | | | |
| Ht. 033120 | .096 | 10.0 | .008 | .008 | .98 | 17.82 | 40.49 | .15 | .01 |
| Lot A | .096 | 11.43 | .008 | .009 | .37 | 18.76 | 39.06 | .13 | |
| Lot B | .061 | 12.19 | .010 | .008 | .60 | 17.83 | 38.50 | 1.13 | |
| Lot C | .049 | 11.45 | .010 | .012 | .37 | 17.36 | 37.67 | .13 | 4.00 |
| Bare wire: | | | | | | | | | |
| Ht. 034012 | .083 | 4.78 | .009 | .005 | .41 | 18.04 | 39.95 | .09 | .10 |
| Lot D | .096 | 5.60 | .007 | .010 | .50 | 17.74 | 39.00 | .24 | .18 |
| Lot E | .095 | 4.28 | .015 | .014 | .42 | 18.31 | 39.37 | .20 | |
| Commercial product | .12 | 1.72 | .021 | .008 | .42 | 15.88 | 35.33 | Nil | |

Lots A, B and C made from covered electrodes using core wire Ht. 033120.

Lots D and E made from covered electrodes using core wire Ht. 034012.

Commercial product made from standard commercial electrode.

The chemical analyses reported for the 033120 and 034012 are ladle analyses; those reported for Lots A, B, C, D, E and Commercial product are of the respective weld pads.

Given below in Table VI are the results of tensile tests on the all-weld-metal test samples formed from the bare core wire, from the covered electrodes, and from the commercial AISI Type 330 (18% chromium, 35% nickel, and remainder iron) of various all-weld-metal samples of Table V. The tensile tests are reported in terms of the ultimate tensile strength, the .2% yield strength, the percent elongation in 2 inches, the percent reduction in area and the fineness of the tensile fracture. Indication also is given of the character and number of defects appearing at the fracture. Additionally, there separately is reported the character and number of surface defects appearing on a series of separate all-weld-metal samples of Table V subject to overlay bend test, that is, defects on a ground weld metal surface following a 120° bend.

bend samples where the greatest distinction appears. In the alloys of our invention, whether of 10% manganese content or of 5%, the all-weld-metal overlay bend surface is virtually free of rupture and microfissures. In the overlay bend sample of the commercial product some twenty to twenty-five ruptures were noted along with a number of microfissures.

Thus, in conclusion, it will be seen that we provide in our invention a chromium-nickel-iron alloy and products of high manganese content, and preferably with substantial carbon and silicon contents, in which the various objects hereinbefore set forth are successfully achieved. The metal employs a minimum of the expensive ingredient nickel compatible with assured resistance to stress-corrosion cracking and a high level of general corrosion resistance. The metal works well in the hot mill. It welds easily, even in large sections. And it readily lends itself to a variety of fabricating operations, including welding by known and commonly used techniques, in the production of articles, products and equipment of ultimate use. Welded articles, products and equipment according to our invention are suited to duty, where a corrosive atmosphere is encountered, in the as-welded condition.

Since numerous embodiments of our invention may occur to those skilled in the art to which the invention TABLE VI.—RESULTS OF ALL-WELD-METAL TENSILE TESTS AND OVERLAY BEND TESTS ON SAMPLES OF TABLE V

| Filler | U.T.S., p.s.i. | 0.2% Y.S., p.s.i. | Percent elongation in 2" | Percent reduction in area | Tensile fracture appearance | | Surface defects Overlay Bend |
|---|---|---|---|---|---|---|---|
| | | | | | Percent fine | Defects | |
| 033120 .062" rd. bare wire. | 90,600 | 58,600 | 27.5 | 32 | 90 | Porosity, microfissures | Some ruptures, microfissures. |
| Lot A | 85,000 | 55,000 | 41.0 | 52 | 98 | Some separations | No ruptures. |
| Lot B | 93,000 | 65,700 | 32.0 | 43 | 100 | None | 10 very small ruptures. |
| Lot C | 89,000 | 58,500 | 42.0 | 51 | 98 | Some separations | No ruptures. |
| 034012 .062" rd. bare wire. | 80,900 | 49,100 | 37.0 | 51 | 94 (Bright) | Microfissures, separations | Several unfused areas, microfissures. |
| Lot D | 84,300 | 56,500 | 38.5 | 56 | 99 | A few separations | No ruptures. |
| Lot E | 83,600 | 56,000 | 39.5 | 56 | 98 | Some small separations | Do. |
| Commercial product | 84,400 | 60,600 | 34.0 | 46 | | Not examined | 20–25 ruptures, some microfissures. |

NOTE.—Defects identified as "separations" are on a plane parallel to the direction of loading and appear on the tensile fracture face as a linear separation.

The superiority of the chromium-nickel-manganese-iron alloys of the present invention, as distinguished from the chromium-nickel-iron alloy of the prior art is readily apparent from the results reported in Table VI above. The alloys of Lots A, B and C (about 18% chromium, 40% nickel, 11% manganese, and remainder iron, of carbon contents .10%, .06% and .05%, respectively, with or without columbium and tungsten) are stronger and yet more ductile than the commercial product (about 16% chromium, 35% nickel, 2% manganese, .12% carbon, and remainder iron). The tensile strength amounts to some 85,000 to 93,000 p.s.i. for the samples of our alloy as compared with some 84,400 p.s.i. for the commercial product. And the elongation amounts to about 32.0% to 42.0% for the all-weld-metal samples as compared with an elongation of 34.0% for the commercial product.

For the alloys of lower manganese content, Lots D and E (about 18% chromium, 40% nickel, 5% manganese, relates, and since many variations of the several embodiments herein disclosed may be made, it will be understood that all matter described herein is to be taken as illustrative and not by way of limitation.

We claim as our invention:

1. Alloy possessing good hot-working and good welding characteristics in combination with good stress-corrosion crack-resistance and good general corrosion resistance, said alloy essentially consisting of about 15% to about 25% chromium, about 35% to about 50% nickel, about 3.5% to about 12% manganese, up to about .15% carbon with carbon at least about .10%, .06%, .04% and .02% for the respective nickel contents of about 35%, 40%, 45% and 50%, up to about 2.0% silicon, and remainder substantially all iron.

2. Alloy essentially consisting of about 19% to about 25% chromium, about 35% to about 50% nickel, about 5% to about 12% manganese, .02% to about .15% carbon with carbon at least about .10%, .06%, .04% and .02% for the respective nickel contents of about 35, 40%, 45% and 50%, sulphur not exceeding about .015%, silicon up to about 2.0%, nitrogen not over about .05%, columbium up to about 1.5% molybdenum up to 3.0%, copper up to 3.0%, boron up to about 0.10%, and remainder substantially all iron, this amounting to about 8% to about 46%.

3. Alloy essentially consisting of about 15% to about 25% chromium, about 40% to about 45% nickel, about 5% to about 12% manganese, about .04% to about .15% carbon with carbon at least about .06% for a nickel content of about 40%, about .5% to about 1% silicon, and remainder essentially iron.

4. Alloy essentially consisting of about 15% to about 21% chromium, about 40% to about 45% nickel, about 3.5% to about 12% manganese, about .04% to about .10% carbon with carbon at least about .06% for a nickel content of about 40%, up to about 2.0% silicon, sulphur not exceeding .015%, and remainder essentially all iron.

5. Alloy essentially consisting of about 15% to about 25% chromium, about 35% to about 40% nickel, about 5% to about 12% manganese, about .06% to about .15% carbon with carbon at least about .10% for a nickel content of about 35%, about .5% to about 1% silicon, and remainder substantially all iron.

6. Alloy essentially consisting of about 15% to about 25% chromium, about 45% to about 50% nickel, about 3.5% to about 12% manganese, up to about .15% carbon with carbon at least about .04% for a nickel content of about 45%, about .5% to about 1.0% silicon, up to about 1.5% columbium, up to about .010% boron, and remainder substantially all iron.

7. Alloy essentially consisting of about 15% to about 21% chromium, about 45% to about 50% nickel, about 3.5% to about 12% manganese, about .03% to about .10% carbon with carbon at least about .04% for a nickel content of about 45%, sulphur not exceeding .015%, up to about 2.0% silicon, and remainder substantially all iron.

8. Flat-rolled alloy plate, sheet, strip, and the like essentially consisting of about 15% to about 25% chromium, about 35% to about 50% nickel, about 3.5% to 12% manganese, up to about .15% carbon with carbon at least about .10%, .06%, .04% and .02% for the respective nickel contents of about 35%, 40%, 45% and 50%, up to about 2 silicon, not over about .05% nitrogen, up to about 1% columbium, up to about 3.0% molybdenum, up to about 3.0% copper, up to about .010% boron, and remainder substantially all iron.

9. Flat-rolled alloy plate, sheet, strip, and the like essentially consisting of about 15% to about 21% chromium, about 40% to about 45% nickel, about 5% to about 12% manganese, .04% to about .15% carbon with carbon at least about .06% for a nickel content of about 40%, up to 2% silicon, up to 1% columbium, and remainder substantially all iron.

10. Flat-rolled alloy plate, sheet, strip, and the like essentially consisting of about 15% to about 21% chromium, about 45% to about 50% nickel, about 5% to about 12% manganese, about .03% to about .15% carbon with carbon at least about .04% for a nickel content of about 45%, up to 2% silicon, up to 1% columbium, and remainder substantially all iron.

11. Alloy castings, forging and reforging stock essentially consisting of about 15% to about 25% chromium, about 35% to about 50% nickel, about 3.5% to about 12% manganese, up to about .15% carbon with carbon at least about .10%, .06%, .04% and .02% for the respective nickel contents of about 35%, 40%, 45% and 50%, up to about 2 silicon, up to about 3.0% molybdenum, up to about 3.0% copper, and remainder substantially all iron.

12. Alloy bar, rod and wire essentially consisting of about 15% to about 25% chromium, about 35% to about 50% nickel, about 3.5% to about 12% manganese, up to about .15% carbon with carbon at least about .10%, .06%, .04% and .02% for the respective nickel contents of about 35%, 40%, 45% and 50%, up to about 2% silicon, up to about 1 columbium, up to about 3.0% molybdenum, up to about 3.0% copper, up to .010% boron, and remainder substantially all iron.

13. Weld filler wire essentially consisting of about 15% to about 21% chromium, about 40% to about 45% nickel, about 3.5% to about 12% manganese, about .04% to about .10% carbon with carbon at least about .06% for a nickel content of about 40%, up to about 2% silicon, sulphur not exceeding 0.15%, and remainder substantially all iron.

References Cited

UNITED STATES PATENTS

| | | | |
|---|---|---|---|
| 1,542,233 | 6/1925 | Girin | 75—128 |
| 1,962,702 | 6/1934 | Armstrong | 75—128 |
| 2,215,734 | 9/1940 | Harder | 75—128 |
| 2,451,547 | 10/1948 | German | 75—128 |
| 2,792,155 | 11/1956 | Eisermann et al. | 75—128 |
| 2,894,833 | 7/1959 | Linnert | 75—128 |
| 3,168,397 | 2/1965 | Scharfstein | 75—128 |
| 3,113,021 | 12/1963 | Witherell | 75—171 |
| 3,384,476 | 5/1968 | Egnell | 75—128 |

FOREIGN PATENTS 986,061    3/1965    Great Britain.

L. DEWAYNE RUTLEDGE, Primary Examiner

P. WEINSTEIN, Assistant Examiner

U.S. Cl. X.R.

75—125, 171; 148—37, 38; 219—137, 145